United States Patent
Boehringer et al.

(10) Patent No.: US 6,628,004 B1
(45) Date of Patent: Sep. 30, 2003

(54) DEVICE AND METHOD FOR GENERATING A PARTIALLY SYNTHESIZED SIGNAL WITH VERY GOOD DYNAMIC QUALITY FOR THE ACCELERATION OF A ROTOR IN AN ELECTRICAL DRIVE MECHANISM

(75) Inventors: Christa Boehringer, Stuttgart (DE); Ralph Schmidt, Sondermoning (DE)

(73) Assignee: Johannes Heidenhain, GmbH, Traunreut (DE)

(*) Notice: Subject to any disclaimer, the term of this patent is extended or adjusted under 35 U.S.C. 154(b) by 0 days.

(21) Appl. No.: 09/830,359
(22) PCT Filed: Nov. 3, 1999
(86) PCT No.: PCT/EP99/08376
§ 371 (c)(1), (2), (4) Date: Apr. 25, 2001
(87) PCT Pub. No.: WO00/28334
PCT Pub. Date: May 18, 2000

(30) Foreign Application Priority Data

Nov. 5, 1998 (DE) .......................... 198 51 003

(51) Int. Cl.$^7$ ................................ H02P 9/00
(52) U.S. Cl. ........................... 290/7; 322/37
(58) Field of Search ............ 290/7, 8, 39, 46; 322/20, 21, 24, 29, 37, 45, 99; 318/600, 700, 720

(56) References Cited

U.S. PATENT DOCUMENTS 3,662,251 A   5/1972 Smith .................. 322/23
5,585,709 A * 12/1996 Jansen et al. .......... 318/720

(List continued on next page.)

FOREIGN PATENT DOCUMENTS

EP   0 139 010 A1   5/1985
EP   0 661 543 A1   7/1995

OTHER PUBLICATIONS

Weck, M, Krüger, P., Brecher, C., Remy, F., Statistical and Dynamic Rigidity of Linear Direct Drives, (Statische and Dynamische Steifigkeit von linearen Direktantrieben) Antriebstechik 36 (1997), No. 12, pp. 57–63.

Gambach, H., Servo drives with two–point cascade control of their rotary acceleration, [Servoantriebe mit unterlagerter Zweipunktregelung ihrer Drehbeschleunigung], Dissertation, University of Stuttgart, 1993.

(List continued on next page.)

*Primary Examiner*—Nicholas Ponomarenko
(74) *Attorney, Agent, or Firm*—Roylance, Abrams, Berdo & Goodman, LLP (57) ABSTRACT

A system and method for controlling the acceleration of an armature of an electric drive by generating a high quality acceleration error correction signal z, the system comprising an accelerometer for obtaining a measured armature acceleration value $b_m$, which is equal to the product of a true armature acceleration $\alpha$, and an acceleration measurement transfer function $F_g(p)$, and means for obtaining a measured acceleration signal, $b_E m$, which is generated from a measured substitute acceleration signal $b_E \cdot b_m$ and $b_E m$ are scaled such that the relationship of $b_m = \alpha \cdot F_g(p) = b_{Em} \cdot F_g(p)$ is satisfied. The measured armature acceleration signal $b_m$ is filtered with a first filter transfer function of $F_T(p)$, and the measured acceleration signal $b_{Em}$ is filtered with a second filter transfer function of $F_H(p)$. The first and second filter outputs are combined to form the partly synthesized high quality acceleration error correction signal $z = b_m \cdot F_T(p) + b_{Em} \cdot F_H(p)$.

28 Claims, 4 Drawing Sheets

U.S. PATENT DOCUMENTS

| | | | | |
|---|---|---|---|---|
| 5,998,957 | A | * 12/1999 | Tadmor et al. | 318/254 |
| 6,118,238 | A | * 9/2000 | Munro et al. | 290/46 |
| 6,121,747 | A | * 9/2000 | Trachtenberg | 318/600 |
| 6,344,725 | B2 | * 2/2002 | Kaitani et al. | 318/700 |
| 6,414,455 | B1 | * 7/2002 | Watson | 318/432 |
| 2001/0048283 | A1 | * 12/2001 | Kaitani et al. | 318/700 |
| 2001/0054876 | A1 | * 12/2001 | Fujita et al. | 318/600 |

OTHER PUBLICATIONS

Boehringer, A., Setting of Switching States in Power Electronics Actuators by the Directly Desired Effect [Einstellung der Schaltzustände in Stellgliedern der Leistungselektronik], etzArchiv, vol. 11 (1989), No. 12, pp. 381–388.

Schwarz, B., Contributions to Rapid–Reaction and High–Accuracy Rotary Current Positioning Systems, (Beiträge zu reaktionsschnellen und hochgenauen DrehstromPositioniersystemen) Dissertation, University of Stuttgart, 1986.

Leonhard, W., Electric Variable Speed Drives for Mechanical Engineering, State of the Art, Trends in Development, (Electrische Regelantriebe für den Maschinenbau, Stand der Technik, Entwicklungstendenzen. VDI [Association of German Engineers] –Zeitschrift (1981), No. 10.

Article by P.–K. Budig et al., "Zur Anwendung eines Beschleunigungssensors in Antriebssystemen," Elektrie, DD, Veb Verlag Technik. Berlin, Bd. 44, Nr. 6, Jan. 1, 1990, Seiten 205–206, XP000149331, ISSN: 0013–5399.

* cited by examiner

DEVICE AND METHOD FOR GENERATING A PARTIALLY SYNTHESIZED SIGNAL WITH VERY GOOD DYNAMIC QUALITY FOR THE ACCELERATION OF A ROTOR IN AN ELECTRICAL DRIVE MECHANISM

FIELD OF THE INVENTION

The invention relates to a method and system for controlling rotary or linear electric drives. More particularly, the invention relates to a system and method for the generation of a partly synthesized signal of high dynamic quality to control the acceleration of an armature (rotary or linear) of an electric drive.

BACKGROUND OF THE INVENTION

In order to design high-quality position or speed control for a rotary or linear electric drive it has been customary in the past to control the components directly generating torque or force in the innermost loop, that is, in cascade control. The most recent developments have shown that on the other hand it is highly advantageous not to control the torque or force generating components of the current volume indicators indirectly, but to guide the acceleration of the part propelled, that is, in cascade control. In the case of rotary drives this is the spin of the rotor, and in the case of linear drives it is the linear acceleration of the armature. Hence, use of an accelerometer is required for registration of these values.

One type of accelerometer that may be used, for example, is an accelerometer which operates on the Ferraris principle. These types of accelerometers have certain deficiencies though. This type of accelerometer, on the whole, is characterized by a delay in measurement, albeit a small one. Another deficiency is that this accelerometer can never be completely rigidly connected to the place engaged by rotary thrust in the case of a rotary drive, or by linear thrust in the case of a linear drive. The result of these two facts is that loop limit cycles and/or self-excited oscillations are formed in the cascade control loop for the acceleration.

Unless these limit cycles and/or self-excited oscillations are prevented, use of such a cascade control loop is not successful for high-quality position or speed control. A method for suppression of these limit cycles and/or self-excited oscillations in the cascade control loop for acceleration has been proposed for rotary drives. However, this process has the disadvantage that its application is extremely costly and that it reacts with extreme sensitivity to fluctuations in the parameters of the drive. Thus, a need exists for a low cost system and method for cascade controlling the acceleration of an armature of an electric drive that is insensitive to drive fluctuations, and prevents limit cycles and/or self-excited oscillations in the cascade acceleration control loop.

SUMMARY OF THE INVENTION

It is therefore an object of the invention to provide a system and method for controlling the acceleration of an armature of an electric drive by generating a high quality acceleration error correction signal z, the system comprising an accelerometer for obtaining a measured armature acceleration value $b_m$, which is equal to the product of a true armature acceleration $\alpha$, and an acceleration measurement transfer function $F_g(p)$, and means for obtaining a measured acceleration signal, $b_{Em}$, which is generated from a measured substitute acceleration signal $b_E \cdot b_m$ and $b_{Em}$ are scaled such that the relationship of $b_m = \alpha \cdot F_g(p) = b_{Em} \cdot F_g(p)$ is satisfied. The measured armature acceleration signal $b_m$ is filtered with a first filter transfer function of $F_T(p)$, and the measured acceleration signal $b_{Em}$ is filtered with a second filter transfer function of $F_H(p)$. The first and second filter outputs are combined to form the partly synthesized high quality acceleration error correction signal $z = b_m \cdot F_T(p) + b_{Em} \cdot F_H(p)$.

BRIEF DESCRIPTION OF THE DRAWINGS

The novel features and advantages of the present invention will best be understood by reference to the detailed description of the preferred embodiments which follows, when read in conjunction with the following drawings, in which.

DETAILED DESCRIPTION OF THE PREFERRED EMBODIMENTS

The various features of the preferred embodiments will now be described with reference to the drawings, in which like parts are identified with the same reference characters. The following description of the presently contemplated best mode of practicing the invention is not to be taken in a limiting sense, but is provided merely for the purpose of describing the general principles of the invention.

For the purpose of generating a high-quality signal for acceleration of an electric drive, the acceleration signal, $b_m = \alpha \cdot F_g(p)$ (in which $F_g(p)$ describes the measurement transfer function), is first registered (or measured), and then the torque m, or the propulsive force f, as substitute acceleration signal $b_{Em} = m$ or $b_{Em} = f$ is scaled. In scaling the acceleration signal $b_{Em}$, all losses arising throughout propulsion are disregarded and the convention is adopted that an absolutely rigid connection of the surface engaged by the thrust of the drive to the place at which the effect used for registration of acceleration is used. The result is that the relation $b_m = \alpha \cdot F_g(p) = b_{Em} \cdot F_g(p)$ is satisfied.

The acceleration signal $b_m = \alpha \cdot F_g(p)$, is input to a low-pass filter with the low-pass transfer function $F_T(p)$; hence the signal $x = b_m \cdot F_T(p)$ is present at the output of the filter. The substitute acceleration signal ($b_{Em}$) is input to a high-pass filter with the high-pass transfer function $F_H(p)$, which satisfies the relationship of $F_H(p) = F_T(0) - F_T(p) \cdot F_g(p)$. The output of filter 3 is the signal $y = b_{Em} = \alpha \cdot F_g(p) \cdot [F_T(0) - F_T(p) \cdot F_g(p)]$. Lastly, the synthesized signal x+y is formed; it is used as a substitute signal of high dynamic quality for the instantaneous armature acceleration value in automatic control of the drive.

For this purpose, in the case of rotary current propulsion the rotary acceleration $\alpha$ of the rotated armature is registered metrologically by an accelerometer 30 connected to the armature and preferably operating on the Ferraris principle, and is consequently available as measured acceleration signal $b_m=\alpha \cdot F_g(p)$. $F_g(p)$, with $F_g(0)=1$, here represents the so-called measurement transfer function of the accelerometer 30. The torque m of the electric drive 20, hereafter designated as substitute acceleration signal $b_E=m$, is also measured and accordingly is available as measured substitute acceleration signal $b_E=m$. As is to be immediately perceived, use may of course be made, without impairing the operation of the device claimed for the invention, in place of the torque m of the drive, of the torque-forming transverse-current components iq of the current volume indicator of the rotary current fed winding of the drive 20 as substitute acceleration signal $b_E=iq$.

In what follows, as is customary in control engineering, it is assumed that both the measured acceleration signal $b_m$, and on the other measured substitute acceleration signal $b_{Em}$, all losses occurring in the drive in question are disregarded and a mechanically absolutely rigid connection of the surface of the armature rotated engaged by the torque to the position of the rotated part of the rotary acceleration meter at which the effect used for registration of acceleration is generated being taken as a basis, is each scaled so that the relation $b_m=\alpha \cdot F_g(p)=b_{Em} \cdot F_g(p)$ is satisfied. The measured acceleration signal $b_m$ is delivered to the input of a low-pass filter with the low-pass transfer function $F_T(p)$, with $F_T(0)$ preferably equaling 1. Hence the signal $x=b_m \cdot F_T(p)$ can be received at the output of the low-pass filter. The measured substitute acceleration signal $b_{Em}$ is delivered to the input of a high-pass filter with high-pass transfer function $F_H(p)=F_T(0)-F_T(p) \cdot F_g(p)$. Consequently, the signal $y=b_{Em} \cdot [F_T(0)-F_T(p) \cdot F_g(p)]$ may be received at this high-pass filter. A signal $z=b_m \cdot F_T(p)+b_{Em} \cdot [F_T(0)-F_T(p) \cdot F_g(p)]$ is now formed in accordance with the relation $z=x+y$. This synthesized signal is subsequently used as a very high-quality dynamic substitute as the undelayed instantaneous value of the rotary acceleration $\alpha$ of the rotated armature in automatic control of the drive in question.

In the case of a traveling-wave drive, the linear acceleration $\alpha$ of an armature in linear movement is measured by means of an accelerometer mechanically connected to this armature, one preferably operated on the Ferraris principle transposed to linear movement, and is accordingly available as measured acceleration signal $b_m=\alpha \cdot F_g(p)$. In this instance $F_g(p)$, with $F_g(0)=1$, represents the so-called measurement transfer function of the accelerometer. The linear force f of the drive, to be designated in what follows as substitute acceleration signal $b_E=f$, is also measured and is accordingly available as measured substitute acceleration signal $b_{Em}$. As is to be immediately perceived, without impairing the operation of the device claimed for the invention, the transverse-current component iq immediately forming the linear force of the current volume indicator of the multiphase current-fed winding of the drive may be used as substitute acceleration signal $b_E=iq$.

It is assumed in what follows, as is customary in control engineering, that both the measured acceleration signal $b_m$ and the substitute acceleration signal $b_{Em}$, all losses occurring in the drive in question are disregarded and a mechanically absolutely rigid connection of the surface of the armature rotated engaged by the torque to the position of the rotated part of the rotary acceleration meter at which the effect used for registration of acceleration is generated being taken as a basis, is each scaled so that the relation $b_m=\alpha \cdot F_g(p)=b_{Em} \cdot F_g(p)$ is satisfied.

The measured acceleration signal $b_m$ is delivered to the input of a low-pass filter with the low-pass transfer function $F_T(p)$, with $F_T(0)$ preferably equaling 1. Hence the signal $x=b_m \cdot F_T(p)$ can be received at the output of the low-pass filter. The measured substitute acceleration signal $b_{Em}$ is delivered to the input of a high-pass filter with high-pass transfer function $F_H(p)=F_T(0)-F_T(p) \cdot F_g(p)$. Consequently, the signal $y=b_{Em} \cdot [F_T(0)-F_T(p)) \cdot F_g(p)]$ may be received at the output of this high-pass filter. A signal $z=b_m \cdot F_T(p)+b_{Em} \cdot [F_T(0)-F_T(p) \cdot F_g(p)]$ is now formed in accordance with the relation $z=x+y$. This synthesized signal is subsequently used as a very high-quality dynamic substitute for the undelayed instantaneous value of rotary acceleration $\alpha$ of the rotated armature in automatic control of the drive in question.

In the case of direct-current propulsion the rotary acceleration $\alpha$ of the rotated armature is measured by an accelerometer connected to this armature and preferably operating on the Ferraris principle, and is consequently available as measured acceleration signal $b_m=\alpha \cdot F_g(p)$. $F_g(p)$, with $F_g(0)=1$, here represents the so-called measurement transfer function of the accelerometer. The torque m of the drive, hereafter designated as substitute acceleration signal $b_E=m$, is also measured and accordingly is available as measured substitute acceleration signal $b_{Em}$. As is to be perceived immediately, use may of course be made directly, without impairing the operation of the device claimed for the invention, in place of the torque m of the drive, of the armature current $i_a$ of the direct-current fed winding of the drive as substitute acceleration signal $b_E=i_a$.

It is assumed in what follows, as is customary in control engineering, that both the measured acceleration signal $b_m$ and the substitute acceleration signal $b_{Em}$, all losses occurring in the drive in question are disregarded and a mechanically absolutely rigid connection of the surface of the armature rotated engaged by the torque to the position of the rotated part of the rotary acceleration meter at which the effect used for registration of acceleration is generated being taken as a basis, is each scaled so that the relation $b_m=\alpha \cdot F_g(p)=b_{Em} \cdot F_g(p)$ is satisfied.

The measured acceleration signal $b_m$ is delivered to the input of a low-pass filter with the low-pass transfer function $F_T(p)$, with $F_T(0)$ preferably equaling 1. Hence the signal $x=b_m \cdot F_T(p)$ can be received at the output of the low-pass filter. The measured substitute acceleration signal $b_{Em}$ is delivered to the input of a high-pass filter with high-pass transfer function $F_H(p)=F_T(0)-F_T(p) \cdot F_g(p)$. Consequently, the signal $y=b_{Em} \cdot [F_T(0)-F_T(p) \cdot F_g(p)]$ may be received at the output of this high-pass filter. A signal $z=b_m \cdot F_T(p)+b_{Em} \cdot [F_T(0)-F_T(p) \cdot F_g(p)]$ is now formed in accordance with the relation $z=x+y$. This synthesized signal is subsequently used as a very high-quality dynamic substitute as the undelayed instantaneous value of the rotary acceleration $\alpha$ of the rotated armature in automatic control of the drive in question.

The device and the process for obtaining a partly synthesized signal of high dynamic value for acceleration of the armature of a machine is explained in detail in what follows on the basis of an example of a separately excited direct-current machine and with reference to the drawings in FIGS. 1 to 4.

It is advantageous in the design of a high-quality position or speed control for a separately excited direct-current machine to control rotary acceleration of the armature rather than the armature current in the innermost loop. For this purpose, the rotary acceleration $\alpha$ of the rotor is measured by an accelerometer, preferably one operating on the Ferraris principle, and is accordingly available as measured rotary acceleration $b_m=\alpha \cdot F_g(p)$. Block 1 (see FIGS. 1, 2, 3, and 4) with transfer function $F_g(p)$, with $F_g(0)=1$, describes the so-called measurement frequency response of the accelerometer 30. The torque m of the drive 20, which in what follows is designated as substitute acceleration signal $b_E$=m, is also measured and accordingly is available as measured substitute acceleration signal $b_{Em}$. Armature current $i_a$ of the direct-current-fed armature winding of the drive may, of course, also be used as substitute acceleration signal $b_E$=$i_a$ in place of the moment m of the drive.

It is assumed, in what follows, as is customary in control engineering, that both the measured acceleration signal $b_m$ and the measured substitute acceleration signal $b_{Em}$, all losses occurring in the drive in question are disregarded and a mechanically absolutely rigid connection of the surface of the armature rotated engaged by the torque to the position of the rotated part of the rotary acceleration meter at which the effect used for registration of acceleration is generated being taken as a basis, is each scaled so that the relation $b_m$=$\alpha \cdot F_g$(p)=$b_{Em} \cdot F_g$(p) is satisfied.

The measured acceleration signal $b_m$ is delivered to the input of a low-pass filter 2 (see FIGS. 1, 2, 3, and 4) with the low-pass transfer function $F_T$(p), with $F_T$(0) preferably equaling 1. Hence the signal x=$b_m \cdot F_T$(p) can be received at the output of the low-pass filter 2. The measured substitute acceleration signal $i_{bm}$ is delivered to the input of a high-pass filter 3 (see FIGS. 1 and 2) with high-pass transfer function $F_H$(p)=$F_T$(0)−$F_T$(p)·$F_g$(p). Consequently, the signal y=$b_{Em}$·[$F_T$(0)−$F_T$(p)·$F_g$(p)] is output from the high-pass filter 3.

A signal z=$b_m$·$F_T$(p)+$b_{Em}$·[$F_T$(0)−$F_T$(p)·$F_g$(p)] is now formed in accordance with the relation z=x+y. This synthesized signal is subsequently used as a very high-quality dynamic substitute as the undelayed instantaneous value of the rotary acceleration α of the rotated armature in automatic control of the drive in question. The difference between the set value $\alpha_{soll}$ assigned by a superimposed control system and the synthesized signal z is delivered to a suitable control unit 4 as control difference (see FIG. 1). Delay of the measurement transfer function $F_g$(p) and the considerable disturbance of the transfer function $F_M$(p) are eliminated from the control frequency response, which is of decisive importance for stability, possible limiting cycles, and self-excited oscillations.

Figure 1:
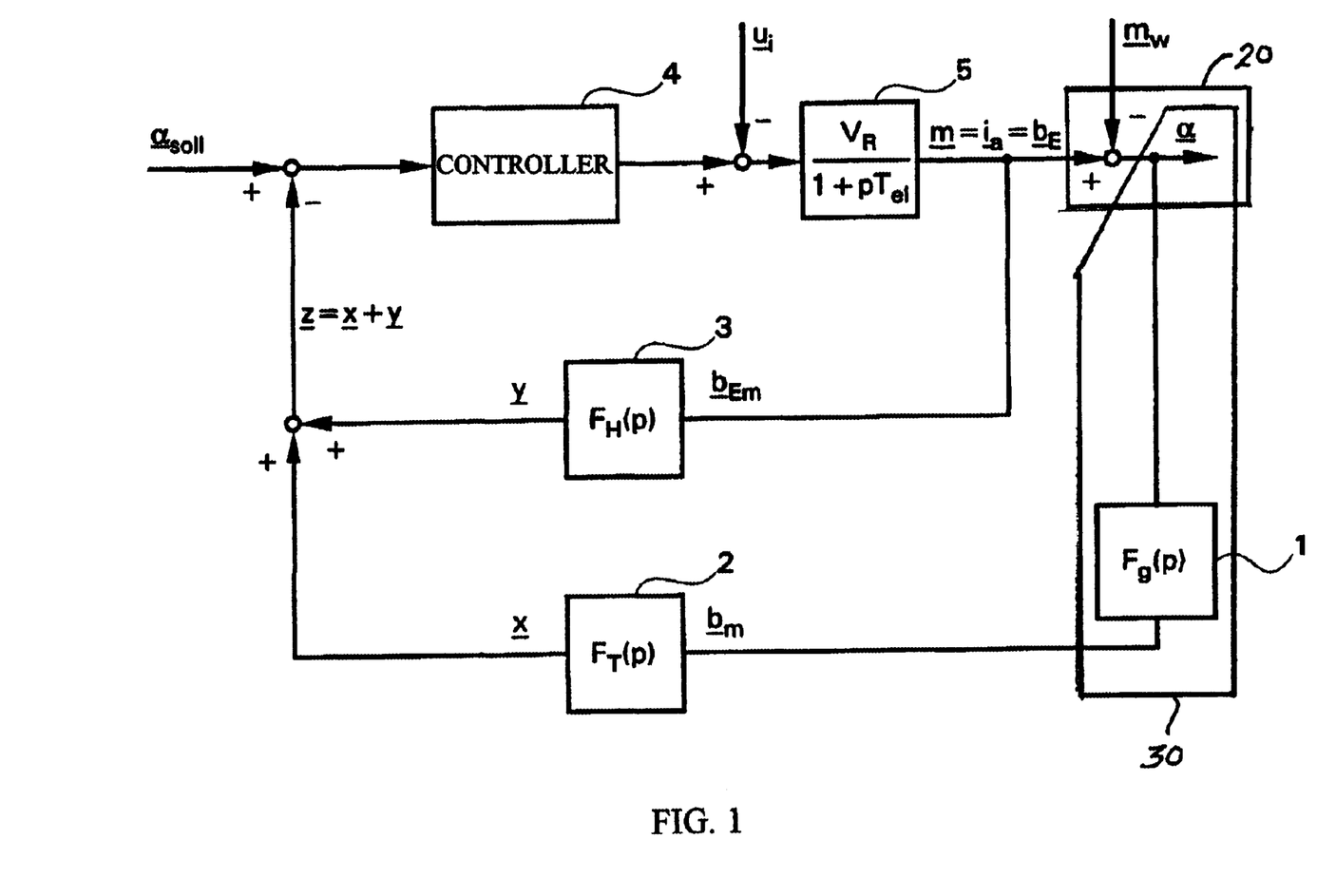
FIG. 1 illustrates a control system for a plurality of electric drive types, in accordance with an embodiment of the invention.

The last-named transfer function, $F_M$(p), describes the mechanical frequency response between the surface of the armature moved which is engaged by the thrust of the drive and the position of the moved part of the accelerometer at which the effect used for registration of acceleration is generated. The low-pass filter with low-pass transfer function $F_v$(p) almost entirely eliminates the influence of this mechanical frequency response. So long as transfer function $F_M$(p) does not deviate significantly from value 1, damping of the low-pass filter does not exhibit significant values. But, starting with the limit frequency of the low-pass filter, the damping rises sharply, so that the unavoidable resonance step-ups of the mechanical frequency response virtually exert no more influence.

The delay of the acceleration signal $b_m$ by the measurement transfer function $F_g$(P) and the delay additionally caused by the low-pass filter are entirely eliminated by the signal y=$b_{Em}$·$F_H$(p) at the output of the high-pass filter 3 in the frequency response in question of the control loop formed by means of the synthesized signal z.

The system and method of the invention is further described by the balance of elements shown in FIG. 1. The first-order delay element 5 (see FIGS., 1, 2, 3, and 4) with amplification $V_R$ and time constant $T_E$ describes the delayed reaction of the armature current $i_a$ to change in voltage at the input of the delay element.

Figure 2:
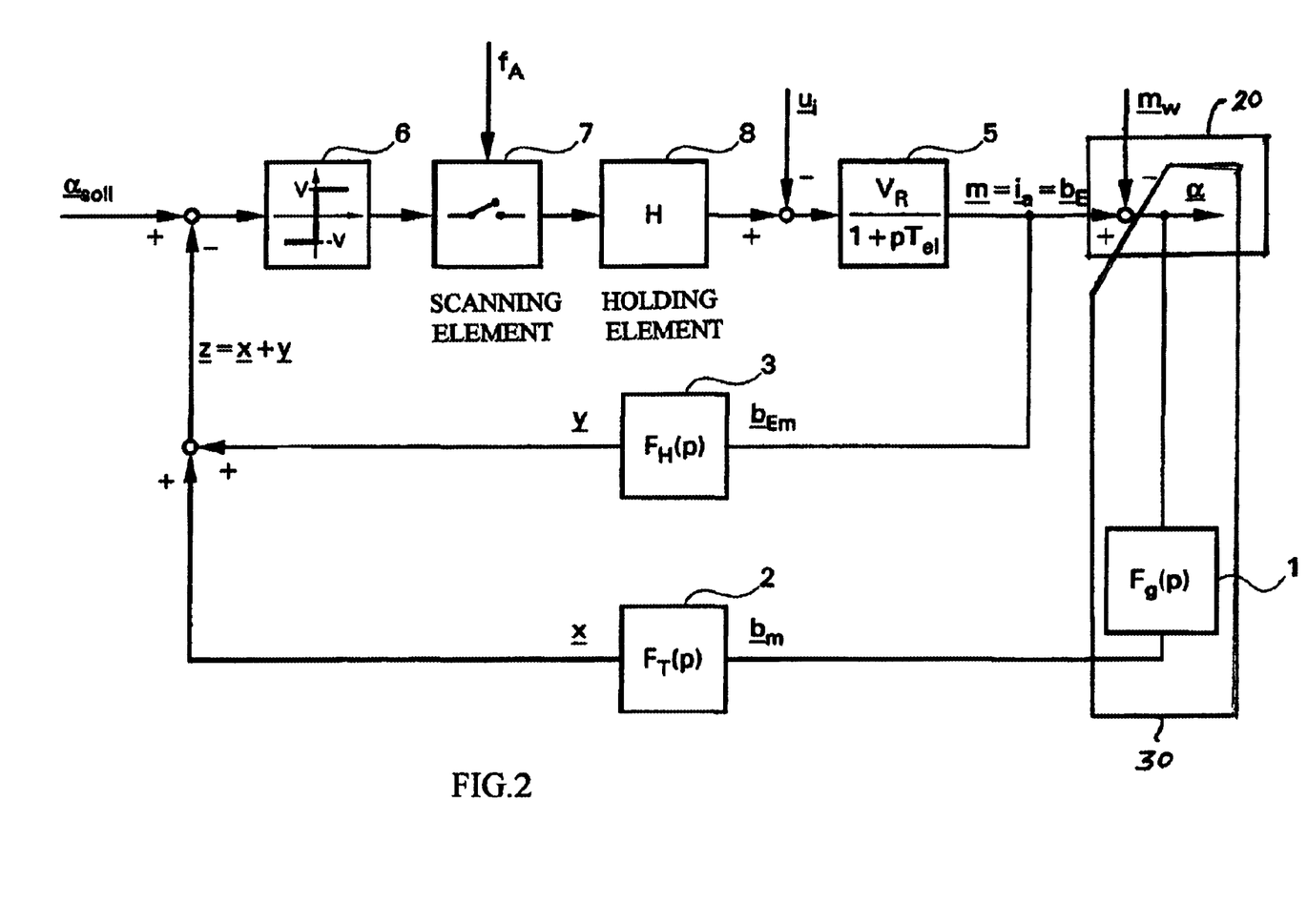
FIG. 2 illustrates a control system for a plurality of electric drive types, in accordance with a first alternative embodiment of the invention.
Figure 3:
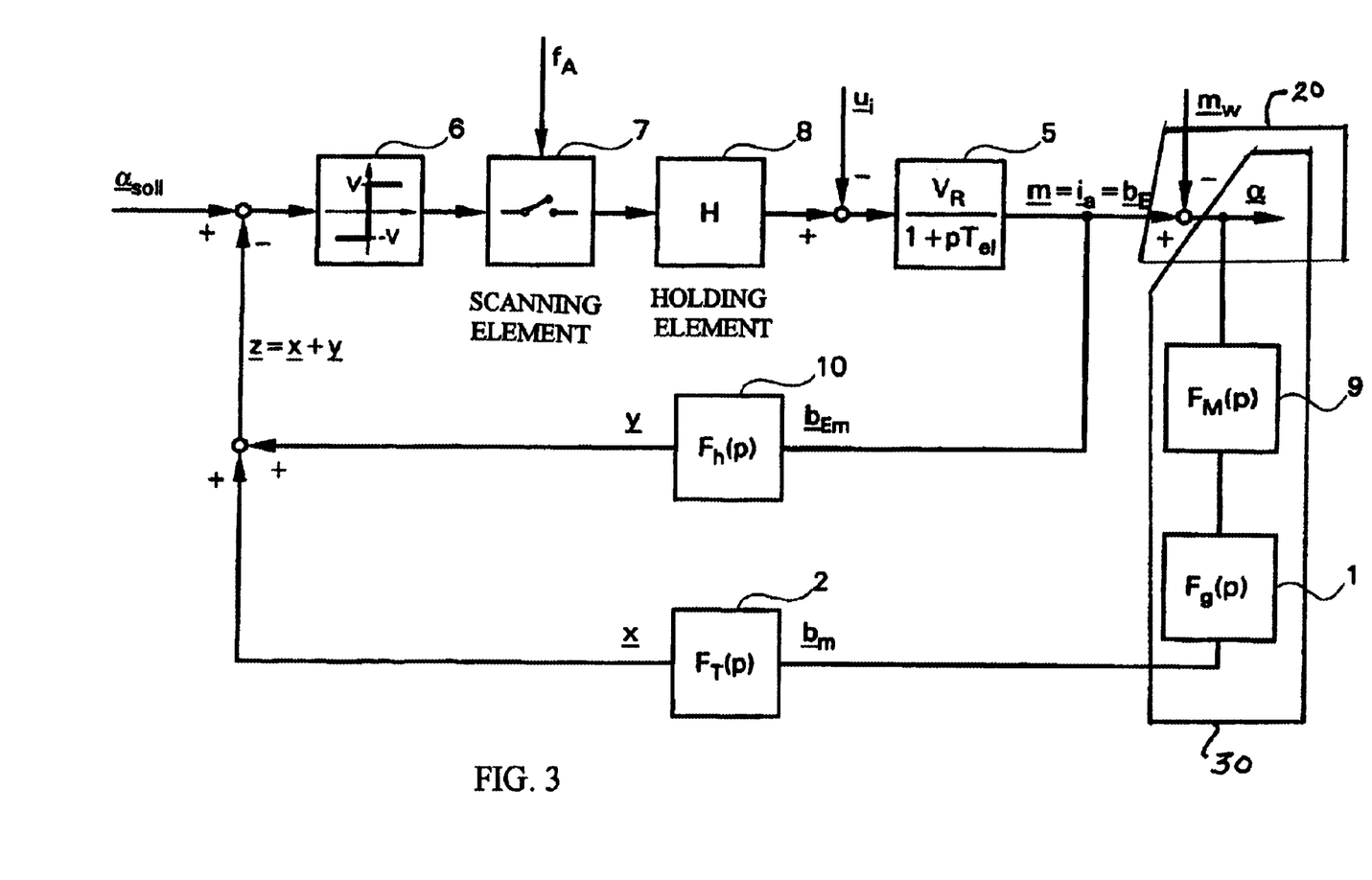
FIG. 3 illustrates a control system for a plurality of electric drive types, in accordance with a second alternative embodiment of the invention.

FIG. 2 illustrates a control system for a plurality of electric drive types, in accordance with a first alternative embodiment of the invention. In FIG. 2, the output voltage of the pulse inverter which feeds the armature winding of the drive is derived directly from a two-point control loop, on the principle of the discrete-time switching condition control with a clock frequency $f_A$=1/$T_A$ in the 100-kHz range. Consequently, in FIG. 2, the controller 4 is replaced by the two-point element 6, a scanning element 7 with scanning frequency $f_A$=1/$T_A$, and a zero-order holding element 8. Amplifications V and −V in the two-point element 6 take the ratio of converter output voltage to rated voltage of the machine into account. The scanning element 7 and the zero-order holding element 8 allow for the effect of discrete-time switching condition control. In this embodiment of the system and method of invention, the limit frequency selected for the low-pass filter 2 with low-pass transfer function $F_T$(p) is to be low enough that no self-excited oscillations occur in the two-point control circuit for synthesized signal z.

Should it occur, as it frequently does, in practical applications that the connection between the measured substitute acceleration signal $b_{Em}$ and the measured acceleration signal $\alpha_m$ is only incompletely described by the equation $\alpha_m$=$F_g$(p)·$b_{Em}$ prove to be a source of disturbance for the quality of the two-point cascade control, the system and method the invention may be expanded. This expansion is characterized by the block shown diagram in FIG. 3. In this instance, the transfer function $F_M$(P) 9 describes the mechanical frequency response between the surface of the armature when it is in motion (which is engaged by the thrust of the electrical drive 20), and the accelerometer which is positioned on the surface of the armature, and which measures its acceleration.

The relationship between the substitute acceleration signal $b_{Em}$ and the measured acceleration $\alpha_m$ is accordingly expressed as $\alpha_m$=$F_M$(p)·$F_g$(p)·$b_{Em}$. This mechanical frequency response with transfer function $F_M$(p) 9 (see FIGS. 3 and 4) is now taken into account in that the high-pass filter 3 with high-pass transfer function $F_H$(p)=$F_T$(0)−$F_T$(p)·$F_g$(p) is replaced by a modified high-pass filter 10 with modified high-pass transfer function $F_h$(p)=$F_T$(0)−$F_T$(p)·$F_g$(p)·$F_M$(p). It is advisable in this process not to set the limit frequency of the low-pass filter 2 with low-pass transfer function $F_T$(p) until the high-pass filter 3 with high-pass transfer function $F_H$(p) has been replaced by modified high-pass filter 10 with modified high-pass transfer function $F_h$(p).

Should the transfer function $F_M$(p) have a plurality of polar and/or zero positions, development of the high-pass filter 10 with modified high-pass transfer function $F_h$(p) is found to be very costly. In order to reduce this cost in development of this high-pass filter 10, the system and method of the invention may be further modified as shown in FIG. 4.

Figure 4:
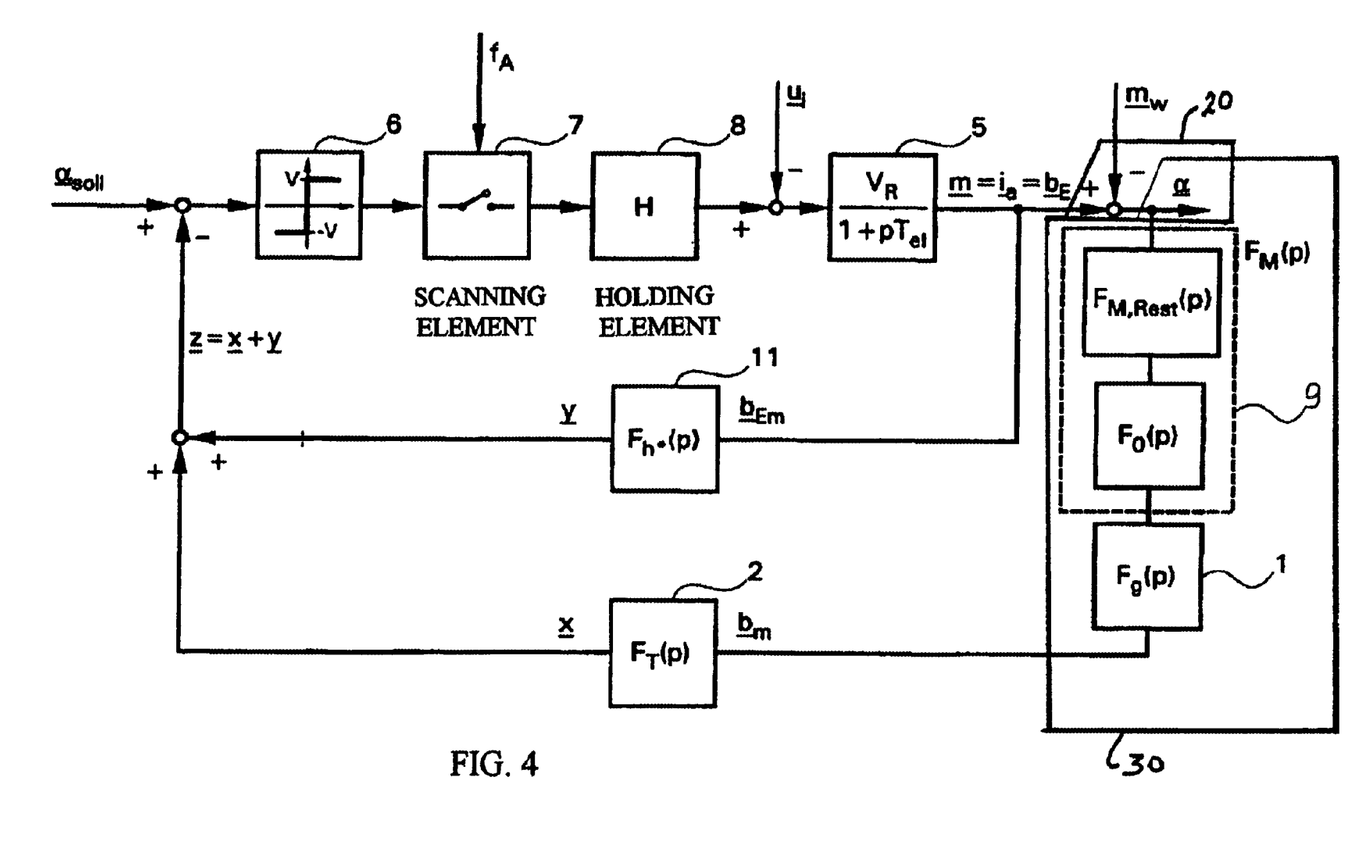
FIG. 4 illustrates a control system for a plurality of electric drive types, in accordance with a third alternative embodiment of the invention.

FIG. 4 illustrates a control system for a plurality of electric drive types in accordance with a third alternative embodiment of the invention. In FIG. 4, the transfer function $F_M$(p) 9 of the mechanical frequency response of FIG. 3 has been separated into two components, $F_{M,REST}$(P) and $F_0$(p). $F_0$(p) is defined as follows:

$$F_0(p) = \frac{(1 + p \cdot T_\mu) \cdot (1 + 2 \cdot D_v \cdot p \cdot T_v + p^2 \cdot T_v^2) \cdots}{(1 + p \cdot T_i) \cdot (1 + 2 \cdot D_j \cdot p \cdot T_j + p^2 \cdot T_j^2) \cdots}$$

This part allows for one or more poles and/or zero positions with particularly high values of $T_\mu$, $T_v$, $T_i$, or $T_j$.

The transfer function of the mechanical frequency response may be described as follows:

$$F_M(p)=F_0(p) \cdot F_{M,Rest}(p), \text{ with } F_{M,Rest}(p)=F_M(p) \cdot F_0^{-1}(p).$$

The mechanical frequency response with transfer function $F_M(p)$ 9 is now taken into account only in approximation in that the high-pass filter 3, with high-pass transfer function $F_H(p)=F_T(0)-F_T(p) \cdot F_g(p)$ is replaced by a modified high-pass filter 11 with modified high-pass transfer function $F_h^*(p)=F_T(0)-F_T(p) \cdot F_g(p) \cdot F_0(p)$. It is advisable not to determine the limit frequency of the low-pass filter 2 with low-pass transfer function $F_T(p)$ in this process until the high-pass filter 3 with high-pass transfer function $F_H(p)$ has been replaced by modified high-pass filter 11 with modified high-pass transfer function $F_h^*(p)$.

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than the preceding description.

What is claimed is:

1. A method for controlling the acceleration of an armature of an electric drive, with means for generating a partly synthesized high quality acceleration error correction signal z, comprising the steps of:
    obtaining a measured armature acceleration value $b_m$, equal to the product of a true armature acceleration $\alpha$, measured by an accelerometer mechanically attached to the armature of the electric drive, and an acceleration measurement transfer function $F_g(p)$, having a complex frequency variable p whereby the function $F_g(p)$ equals one when p equals 0;
    obtaining a measured acceleration signal, $b_{Em}$, generated from a measured substitute acceleration signal $b_E$;
    scaling the measured armature acceleration value $b_m$ and the measured acceleration signal $b_{Em}$ such that the relationship of $b_m=\alpha \cdot F_g(p)=b_{Em} \cdot F_g(p)$ is satisfied;
    filtering the measured armature acceleration signal $b_m$ with a first filter transfer function of $F_T(p)$, to obtain a first filter output signal $x=b_m \cdot F_T(p)$, in which the first filter transfer function $F_T(p)$ has the complex frequency variable p;
    filtering the measured acceleration signal $b_E m$ with a second filter transfer function of $F_H(p)$, to obtain a second filter output signal $y=b_{Em} \cdot F_H(p)$; and
    combining the first and second filter outputs to form the partly synthesized high quality acceleration error correction signal $z=b_m \cdot F_T(p)+b_{Em} \cdot F_H(p)$.

2. The method according to claim 1, wherein:
    the armature of the electric drive is a rotor set in motion;
    the true armature acceleration $\alpha$ is a rotary acceleration;
    the accelerometer mechanically attached to the armature of the electric drive operates on the Ferraris principle; and
    the substitute acceleration signal $b_E$ represents a torque m of the armature.

3. The method according to claim 2, wherein:
    the electric drive is a rotary current drive; and
    the substitute acceleration signal $b_E$ represents torque forming transverse current components $i_q$ of a current volume indicator of a winding fed by a transverse current of the rotary current drive.

4. The method according to claim 2, wherein:
    the electric drive is a direct current drive; and
    the substitute acceleration signal $b_E$ represents an armature current $i_a$ of the direct current fed winding of the electric drive.

5. The method according to claim 4, wherein:
a limit frequency for the first filter is low enough such that if the direct current fed winding of the electric drive is energize by a multi-phase current produced by a pulse inverter, and an output voltage level indicator on the output operates on the principle of a discrete time change in switching condition control with a clock frequency in the range of 100 kHz directly from a two-point loop control which adjusts an instantaneous value of the partly synthesized high quality acceleration error correction signal z to a set value thereof, then no self excited oscillations arise in the two-point control loop for the partly synthesized high quality acceleration error correction signal z.

6. The method according to claim 1, wherein:
    the armature of the electric drive is an armature set in linear motion of a travelling wave guide;
    the true armature acceleration $\alpha$ is a linear acceleration;
    the accelerometer mechanically attached to the armature of the electric drive operates on the Ferraris principle; and
    the substitute acceleration signal $b_E$ represents a linear force f of the linear drive.

7. The method according to claim 6, wherein:
    the substitute acceleration signal $b_E$ represents a torque forming transverse current components $i_q$ of the current volume indication of a winding fed by a transverse current of the linear drive.

8. The method according to claim 7, wherein:
a limit frequency for the first filter is low enough such that if the drive winding of the electric drive is energized by a direct current produced by a pulse inverter, and an output voltage is derived in accordance with the principle of a discrete time change in switching condition control with a clock frequency in the range of 100 kHz directly from a two-point control loop which adjusts an instantaneous value of the partly synthesized high quality acceleration error correction signal z to a set value thereof, then no self excited oscillations arise in the two-point control loop for the partly synthesized high quality acceleration error correction signal z.

9. The method according to claim 1, wherein:
the limit frequency for the first filter is less than 10 kHz.

10. The method according to claim 1, wherein:
the transfer function $F_H(p)$ of the second filter is equal to $F_T(0)-F_T(p) \cdot F_g(p)$.

11. The method according to claim 9, further comprising:
    obtaining a measured armature acceleration value $b_m$ equal to the product of $F_M(p)$, $F_g(p)$ and $b_{Em}$, in which $F_M(p)$ describes a mechanical frequency response between the surface of the drive set in motion by the thrust of the drive, and a part of the accelerometer set in motion by the surface of the drive;
    characterizing the transfer value of the second filter $F_H(p)=F_h(p)=F_T(0)-F_T(p) \cdot F_g(p) \cdot F_M(p)$; and
    determining the limit frequency of the first filter and the first filter transfer function by taking into account the transfer function of the second filter.

12. The method according to claim 9, further comprising:
obtaining a measured armature acceleration value $b_m$ equal to the product of $F_M(p)$, $F_g(p)$ and $b_{Em}$, in which $F_M(p)$ describes a mechanical frequency response between the surface of the drive set in motion by the thrust of the drive, and the part of the accelerometer set in motion by the surface of the drive;

separating from the transfer function $F_M(p)$ a portion $F_0(p)$ to further approximate the mechanical frequency response between the surface of the drive set in motion by the thrust of the drive, and the part of the accelerometer set in motion by the surface of the drive, wherein $$F_0(p) = \frac{(1 + p \cdot T_\mu) \cdot (1 + 2 \cdot D_v \cdot p \cdot T_v + p^2 \cdot T_v^2) \cdots}{(1 + p \cdot T_i) \cdot (1 + 2 \cdot D_j \cdot p \cdot T_j + p^2 \cdot T_j^2) \cdots}$$

determining the transfer function $F_H(p)$ of the second filter as $F_H(p)=F_h^*(p) \approx F_T(0)-F_T(p) \cdot F_g(p) \cdot F_0(p)$; and determining the limit frequency of the first filter with the transfer function $F_h^*(p)$ of the second filter being taken into account.

13. A controller for controlling the acceleration of an armature of an electric drive, with means for generating a partly synthesized high quality acceleration error correction signal z, comprising:

an accelerometer mechanically attached to the armature of the electric drive to measure a true armature acceleration $\alpha$, made available as a measured armature acceleration value $b_m$, equal to the product of the true armature acceleration $\alpha$ and an acceleration measurement transfer function $F_g(p)$, the acceleration measurement transfer function $F_g(p)$ having a complex frequency variable p whereby the function $F_g(p)$ equals one when p equals 0;

means for measuring a substitute acceleration signal $b_E$, made available as a measured acceleration signal, $b_E m$;

means to scale the measured armature acceleration value $b_m$ and the measured acceleration signal $b_{Em}$ such that the relationship of $b_m = \alpha \cdot F_g(p) = b_{Em} \cdot F_g(p)$ is satisfied;

a first filter for filtering the measured armature acceleration signal $b_m$ with a first filter transfer function of $F_T(p)$, to obtain a first filter output signal $x = b_m \cdot F_T(p)$, in which the first filter transfer function $F_T(p)$ has the complex frequency variable p;

a second filter for filtering the measured acceleration signal $b_E m$ with a second filter transfer function of $F_H(p)$, to obtain a second filter output signal $y = b_{Em} \cdot F_H(p)$; and means for combining the first and second filter outputs to form the partly synthesized high quality acceleration error correction signal $z = b_m \cdot F_T(p) + b_{Em} \cdot F_H(p)$.

14. The controller according to claim 13, wherein:
the armature of the electric drive is a rotated armature;
the true armature acceleration $\alpha$ is a rotary acceleration;
the accelerometer mechanically attached to the armature of the electric drive operates on the Ferraris principle; and
the substitute acceleration signal $b_E$ represents a torque m of the armature.

15. The controller according to claim 14, wherein:
the electric drive is a rotary current drive; and
the substitute acceleration signal $b_E$ represents a transverse current component $i_q$ of a current volume indicator of a winding fed by a transverse current of the rotary current drive.

16. The controller according to claim 14, wherein:
the electric drive is a rotary current drive; and
the substitute acceleration signal $b_E$ represents an armature current $i_a$ of an armature winding of the direct current drive fed by a rotating current.

17. The controller according to claim 16, wherein:
a limit frequency for the first filter is low enough such that if the armature winding of the electric drive is energized by a direct current produced by a pulse inverter, and an output voltage level is derived on the principle of a discrete time change in switching state with a clock frequency in the range of 100 kHz directly from a two-point loop control which adjusts an instantaneous value of the partly synthesized high quality acceleration error correction signal z to a set value thereof, then no self excited oscillations arise in the two-point control loop for the partly synthesized high quality acceleration error correction signal z.

18. The controller according to claim 13, wherein,
the armature of the electric drive is an armature of a travelling wave drive in linear motion;
the true armature acceleration $\alpha$ is a linear acceleration;
the accelerometer mechanically attached to the armature of the electric drive operates on the Ferraris principle; and
the substitute acceleration signal $b_E$ represents a linear force f of the linear drive.

19. The controller according to claim 18, wherein:
the substitute acceleration signal $b_E$ represents a torque forming transverse current components $i_q$ of a current volume indicator of a winding of the linear drive energized by a multiphase current.

20. The controller according to claim 18, wherein:
a limit frequency for the first filter is low enough such that if the armature winding of the electric drive is energized by a multiphase current produced by a pulse inverter, and a current level indicator is derived in accordance with the principle of a discrete time change in switching state with a clock frequency in the range of 100 kHz directly from a two-point control loop which adjusts an instantaneous value of the partly synthesized high quality acceleration error correction signal z to a set value thereof, then no self excited oscillations arise in the two-point control loop for the partly synthesized high quality acceleration error correction signal z.

21. The controller according to claim 13, wherein:
the limit frequency for the first filter is less than 10 kHz.

22. The controller according to claim 13, wherein:
the transfer function $F_H(p)$ of the second filter is equal to $F_T(0)-F_T(p) \cdot F_g(p)$.

23. The controller according to claim 13, father comprising:

means to determine a measured nature acceleration value $b_m$ equal to the product of $F_M(p)$, $F_g(p)$ and $b_{Em}$, in which $F_M(p)$ describes a mechanical frequency response between the surface of the drive set in motion by the thrust of the drive, and a part of the accelerometer set in motion by the surface of the drive, and in which the transfer value of the second filter $F_H(p)=F_h(p)=F_T(0)-F_T(p) \cdot F_g(p) \cdot F_M(p)$; and the first filter with the first filter transfer function having a limit frequency determined by taking into account the transfer function of the second filter.

24. The controller according to claim 13, further comprising:

means to determine a measured armature acceleration value $b_m$ equal to the product of $F_M(p)$, $F_g(p)$ and $b_{Em}$, in which $F_M(p)$ describes a mechanical frequency response between the surface of the drive set in motion by the thrust of the drive, and a part of the accelerometer set in motion by the surface of the drive, and which separates from the transfer funtion $F_M(p)$ a portion $F_0(p)$ to further approximate the mechanical frequency response between the surface of the drive set in motion by the thrust of the drive, and the part of the accelerometer set in motion by the surface of the drive, wherein $$F_0(p) = \frac{(1+p \cdot T_\mu) \cdot (1+2 \cdot D_v \cdot p \cdot T_v + p^2 \cdot T_v^2) \cdot \ldots}{(1+p \cdot T_i) \cdot (1+2 \cdot D_j \cdot p \cdot T_j + p^2 \cdot T_j^2) \cdot \ldots}$$

the second filter having a transfer function $F_H(p)$ defined as $F_H(p) = F_h*(p) \approx F_T(0) - F_T(p) \cdot F_g(p) \cdot F_0(p)$; and the first filter having a limit frequency in which the transfer function $F_h*(p)$ of the second filter is taken into account.

25. The method according to claim 1, wherein the first filter is a low pass filter, and the second filter is a high-pass filter.

26. The controller according to claim 13, wherein the first filter is a low pass filter and the second filter is a high-pass filter.

27. The method according to claim 1, wherein:

the function $F_T(p)$ equals one when p equals 0.

28. The controller according to claim 13, wherein the function $F_T(p)$ equals one when p equals 0.

* * * * *

UNITED STATES PATENT AND TRADEMARK OFFICE
CERTIFICATE OF CORRECTION

PATENT NO. : 6,628,004 B1
DATED : September 30, 2003
INVENTOR(S) : Boehringer et al.

It is certified that error appears in the above-identified patent and that said Letters Patent is hereby corrected as shown below:

<u>Title page,</u>
Item [75], Inventors, "Christa Boehringer" should read -- Andreas Boehringer --.
Item [73], Assignee, "Johannes Heidenhain, GmbH" should read -- Dr. Johannes Heidenhain, GmbH --.

Signed and Sealed this

Twenty-third Day of May, 2006

JON W. DUDAS
*Director of the United States Patent and Trademark Office*